(12) United States Patent
Sung

(10) Patent No.: US 12,301,098 B2
(45) Date of Patent: May 13, 2025

(54) DEVICE FOR PROTECTING CONVERTER AND CONTROL METHOD THEREOF

(71) Applicants: Hyundai Motor Company, Seoul (KR); Kia Corporation, Seoul (KR)

(72) Inventor: Byung Jun Sung, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 74 days.

(21) Appl. No.: 17/986,461

(22) Filed: Nov. 14, 2022

(65) Prior Publication Data

US 2023/0198380 A1 Jun. 22, 2023

(30) Foreign Application Priority Data

Dec. 16, 2021 (KR) .................. 10-2021-0180800

(51) Int. Cl.
| | |
|---|---|
| *H02M 1/32* | (2007.01) |
| *B60L 3/00* | (2019.01) |
| *H01M 8/04858* | (2016.01) |
| *H01M 8/249* | (2016.01) |
| *H02M 3/158* | (2006.01) |

(52) U.S. Cl.
CPC ........... *H02M 1/327* (2021.05); *B60L 3/0038* (2013.01); *B60L 3/0069* (2013.01); *H01M 8/0494* (2013.01); *H01M 8/249* (2013.01); *H02M 3/1582* (2013.01)

(58) Field of Classification Search
CPC ........... B60L 53/00; B60L 3/00; B60W 20/00; H01M 2250/00; H02M 1/00
See application file for complete search history.

(56) References Cited

U.S. PATENT DOCUMENTS

| | | | |
|---|---|---|---|
| 2010/0191425 A1* | 7/2010 | Murata | B60W 10/28 701/45 |
| 2019/0193589 A1* | 6/2019 | Toriumi | H01M 8/04567 |
| 2019/0198899 A1* | 6/2019 | Saito | H01M 8/04544 |

FOREIGN PATENT DOCUMENTS

KR 102191146 B1 12/2020

* cited by examiner

*Primary Examiner* — Rexford N Barnie
*Assistant Examiner* — Joseph N Inge
(74) *Attorney, Agent, or Firm* — Fox Rothschild LLP

(57) ABSTRACT

A device for protecting a converter and a control method thereof, the device including: a voltage detection unit that detects at least one of an input-stage voltage and an output-stage voltage of a converter; a switching device that connects an output stage of the converter and a load connected to the output stage, or blocks a connection; a controller that determines whether the detected input-stage voltage or output-stage voltage is out of a preset voltage range, and, when the voltage is out of the range, controls the switching device to cut off the connection between the output stage of the converter and the load; and a driving unit that controls an operation of at least one of the fuel cell and the battery so that a driving force of the vehicle is not generated by the fuel cell and the battery when the connection is cut off.

7 Claims, 6 Drawing Sheets

High Side voltage rises due to load disconnect

EV drive after Relay off

DEVICE FOR PROTECTING CONVERTER AND CONTROL METHOD THEREOF

CROSS REFERENCE TO RELATED APPLICATION

The present application claims under 35 U.S.C. § 119(a) the benefit of and priority to Korean Patent Application No. 10-2021-0180800, filed Dec. 16, 2021, the entire contents of which may be incorporated herein by reference.

1. Field

The present disclosure relates to a device for protecting a converter and a control method thereof and, more particularly, to a device for protecting a converter and a control method thereof, which prevent damage to a converter and other electric powered parts and prevent deterioration of the durability of a fuel cell stack by protecting the converter that boosts the low voltage of a fuel cell from damage due to overcurrent caused by reverse voltage created by a failure of a fuel cell, etc. in a system that generates driving force using the fuel cell and a battery.

2. Background

A fuel cell is a type of power generation device that converts reactant gases including hydrogen and oxygen into electrical energy through electrochemical reaction of the reactant gases in a stack. The fuel cell includes: a membrane electrode assembly (MEA) with a catalyst electrode layer, coated with a catalyst and at which an electrochemical reaction occurs, attached; a gas diffusion layer (GDL) that evenly distributes the reactant gases; and bipolar plates for transporting the reactant gases.

In a vehicle whose driving force is generated by using a fuel cell, when the pressure of hydrogen supplied to the fuel cell is insufficient or the fuel cell/stack fails, the required current may not be output. In this current limit state, the current may flow backwards to a battery side, unlike the case where a voltage on the battery side is higher than the voltage on the fuel cell during normal operation.

Therefore, in this case, the fuel cell output is forcibly generated. Accordingly, durability of the fuel cell stack may be reduced, and a converter connected to the fuel cell may be damaged due to the reverse current.

SUMMARY OF THE DISCLOSURE

The present disclosure is intended to provide a device for protecting a converter and a control method thereof, which prevent damage to a converter and other electric powered parts and prevent deterioration of the durability of a fuel cell stack by protecting the converter that boosts the low voltage of a fuel cell from damage due to overcurrent caused by reverse voltage created by a failure of a fuel cell, etc. in a system that generates driving force from the fuel cell and a battery.

In certain aspects, according to an embodiment of the present disclosure, there is provided a device for protecting a converter, including: a voltage detection unit configured to detect at least one of: an input-stage voltage of the converter and/or an output-stage voltage of the converter; a switching device configured to connect an output stage of the converter and a load connected to the output stage, or cut off an electrical connection; and a controller configured to determine whether a detected input-stage voltage and/or output-stage voltage is outside of a preset voltage range. When the controller determines the detected input stage voltage and/or output-stage voltage is outside of the preset voltage range, the controller directs the switching device to cut off the electrical connection between the output stage of the converter and the load.

In certain aspects, the converter may be chosen from: a boost converter or a buck-boost converter.

In certain aspects, the device for protecting a converter further includes: a temperature sensor configured to sense a temperature of a diode included in the converter. The controller may determine whether the temperature of the diode detected by the temperature sensor is equal to or greater than a first reference temperature and/or whether a temperature change of the diode according to a preset time interval is equal to or greater than a first reference amount. When the controller determines the temperature of the diode is greater than the first reference temperature and the voltage is out of the range and/or when the temperature change of the diode is greater than the first reference amount and the voltage is out of the range, may control the switching device to cut off the connection between the output stage of a boost converter and the load.

In certain aspects, the device for protecting a converter further includes: a warning device, and the controller may be further configured to control the warning device to turn on after directing the switching device to cut off the connection between the output stage of a boost converter and the load.

In certain aspects, a device for protecting a boost converter included in a vehicle powered by a fuel cell and a battery is disclosed. The device may include a voltage detection unit configured to detect at least one of an input-stage voltage and an output-stage voltage of a converter; a switching device configured to connect an output stage of the converter and a load connected to the output stage, and/or block an electrical connection; a controller configured to determine whether the detected input-stage voltage or output-stage voltage is outside of a preset voltage range. When the controller determines the voltage is outside of the preset range, the controller directs the switching device to cut off the connection between the output stage of the converter and the load; and a driving unit configured to control an operation of at least one of the fuel cell and the battery so that a driving force of the vehicle is not generated by the fuel cell and the battery when the connection is cut off.

In certain aspects, the device for protecting a converter further includes: a relay configured to connect or cut off a power supplied to accessories from the fuel cell. The controller may be configured to control the voltage detection unit to detect the input-stage voltage and/or the output-stage voltage of the boost converter after controlling the switching device to cut off the connection between the output stage of the boost converter and the load when the voltage is out of the preset range, and control an on/off function of the relay on a failed fuel cell side on the basis of the detected input-stage voltage and output-stage voltage.

In certain aspects, the controller may be configured to control the relay on a failed fuel cell side to be turned off when a result value of subtracting the detected output-stage voltage from the detected input-stage voltage is less than a first voltage.

In certain aspects, the controller may be configured to control the operation of at least one of the fuel cell and the battery to generate the driving force of the vehicle only after directing the relay to be turned off.

In certain aspects, the device for protecting a converter further includes: a pressure sensor configured to detect a pressure of hydrogen supplied to the fuel cell; and a hydrogen purge valve configured to discharge low-pressure hydrogen, condensed water from a hydrogen electrode, and impurities in the fuel cell to an air electrode. The controller may be configured to control the hydrogen purge valve to perform hydrogen purging on the basis of the detected hydrogen pressure after directing the switching device to cut off the connection between the output stage of the boost converter and the load.

In certain aspects, the device for protecting a converter further includes: a water level sensor configured to detect a water level in a water trap where water vapor generated in the fuel cell is condensed; and a drain valve configured to regulate an air pressure in the fuel cell and discharges condensed water in the water trap to an air electrode. The controller may be configured to control the drain valve to discharge water therefrom on the basis of the detected water level in the water trap after directing the switching device to cut off the connection between the output stage of the boost converter and the load.

In certain aspects, the device for protecting a converter further includes: a temperature sensor configured to sense a temperature of a diode included in the converter. The controller may be configured to determine whether the temperature of the diode detected by the temperature sensor is equal to or greater than a first reference temperature and/or whether a temperature change of the diode according to a preset time is equal to or greater than a first reference amount. When the controller determines the temperature of the diode exceeds the first reference temperature and/or the voltage is out of the preset range and/or when the temperature change of the diode exceeds the first reference amount and the voltage is out of the range, the controller may direct the switching device to cut off the connection between the output stage of the boost converter and the load.

In certain aspects, the device for protecting a converter further includes: a warning device, and the controller may be configured to direct the warning device to be turned on after controlling the switching device to cut off the connection between the output stage of the boost converter and the load.

In another aspect, a control method of a converter protecting a boost converter included in a vehicle powered by a fuel cell and a battery. The method may include the steps of: detecting, by a voltage detection unit, at least one of: an input-stage voltage and/or an output-stage voltage of the boost converter; controlling, by a controller, a switching device, to cut off a electrical connection between the output stage of the boost converter and a load connected to the output stage when the detected input-stage voltage and/or output-stage voltage is outside of a preset voltage range after determining whether the voltage is outside of the preset range; and controlling, by the controller, an operation of at least one of the fuel cell and/or the battery so that a driving force of the vehicle is not generated by the fuel cell and/or the battery when the connection is cut off.

In certain aspects, the controlling the switching device step may further include: controlling an on/off function of a relay configured to connect or cut off a power supplied to accessories from the fuel cell on a failed fuel cell side on the basis of the detected input-stage voltage and/or output-stage voltage after controlling the voltage detection unit to detect the input-stage voltage and/or the output-stage voltage of the boost converter after controlling the switching device.

In certain aspects, in the controlling an on/off function of a relay step, the relay may be controlled to be turned off when a result value of subtracting the detected output-stage voltage from the detected input-stage voltage is less than a first voltage.

As described above, the device for protecting a converter according to the present disclosure may protect a converter that boosts the low voltage of a fuel cell from damage due to overcurrent caused by reverse voltage created by a failure of a fuel cell, etc. in a system that generates driving force from the fuel cell and a battery.

In addition, the device for protecting a converter according to the present disclosure may prevent damage to a converter and other electric powered parts, thereby reducing costs due to replacement of parts and preventing performance degradation of a fuel cell vehicle.

Furthermore, the device for protecting a converter according to the present disclosure may increase the operable time of a fuel cell vehicle by preventing a decrease in durability of a fuel cell stack.

In a further aspects, vehicles are provided that comprise a device for protecting a converter, the device comprising: (a) a voltage detection unit configured to detect at least one of: an input-stage voltage of the converter and/or an output-stage voltage of the converter; (b) a switching device configured to connect an output stage of the converter and a load connected to the output stage, or cut off an electrical connection between the output stage of the converter and the load; and (c) a controller configured to determine whether a detected input-stage voltage and/or output-stage voltage is outside of a preset voltage range, wherein when the controller determines the detected input-stage voltage and/or output-stage voltage is outside of the preset voltage range, the controller directs the switching device to cut off the electrical connection between the output stage of the converter and the load.

The effects of the present disclosure may be not limited to the technical effects as described above, and other technical effects may be derived from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

Figure 1:
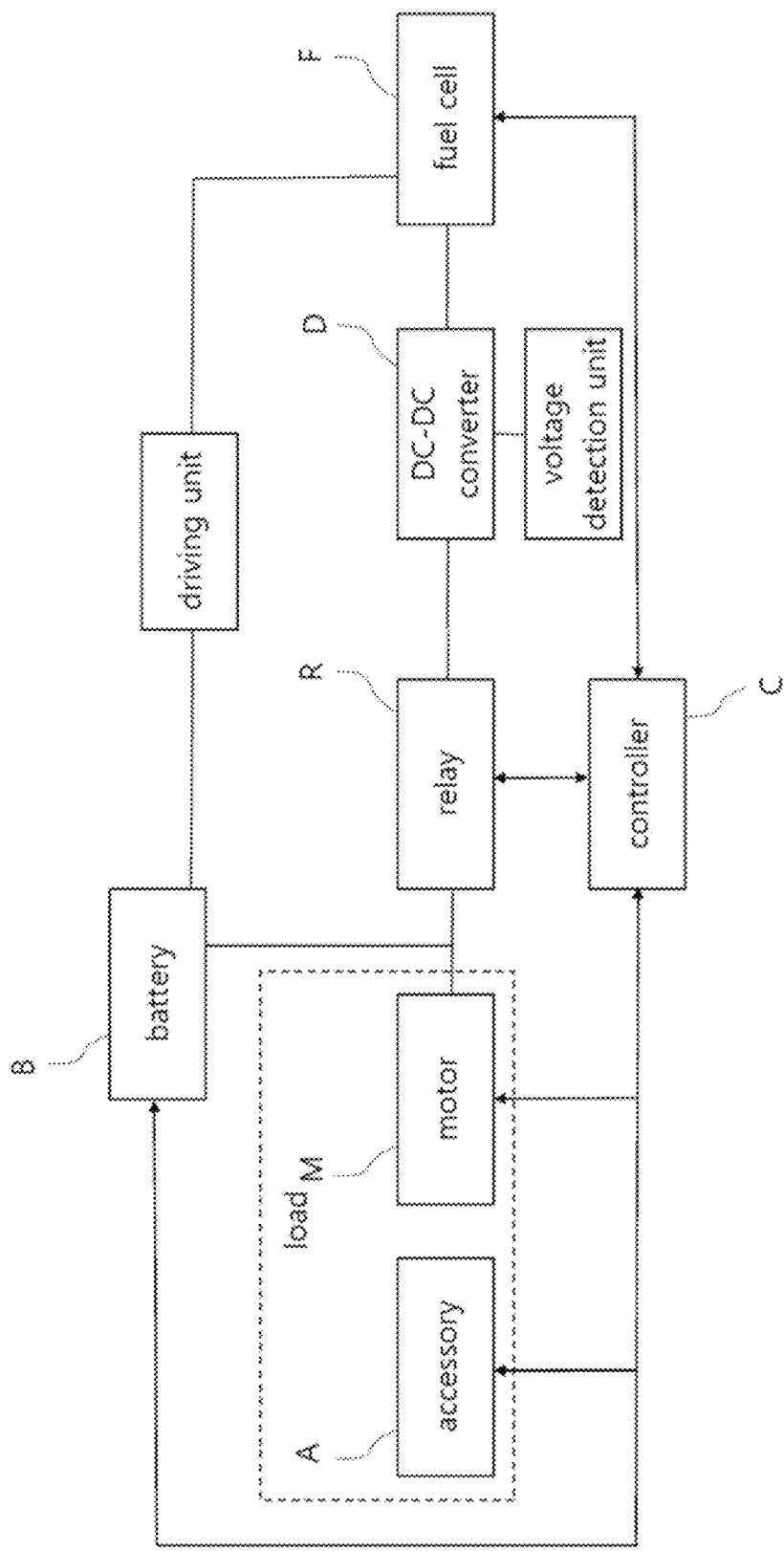
FIG. 1 is a block diagram of a device for protecting a converter according to an embodiment of the present disclosure.

Specific structural or functional descriptions of the embodiments of the present disclosure disclosed in the present specification or application may be merely illustrative for the purpose of describing the embodiments according to the present disclosure, and the embodiments according to the present disclosure may be implemented in various forms and should not be construed as being limited to the embodiments described in the present specification or application.

In order to clearly explain the present disclosure, parts irrelevant to the description may be omitted, and the same reference numerals may be given to the same or similar elements throughout the specification. In addition, the singular expression includes the plural expression unless the context clearly dictates otherwise.

In the following detailed description, the reason for dividing the names of components into first, second, etc. is to distinguish them in the same relationship, and the order is not necessarily limited in the following description. For example, without departing from the scope of rights according to the concept of the present disclosure, the first component may be named as the second component, and similarly, the second component may also be referred to as the first component.

Throughout the specification, when it is said that a part "includes" or "has" a certain component, it does not exclude other components, but may further include other components unless otherwise stated. In other words, it should be understood that in this specification, the term "comprise" or "have" is intended to indicate the presence of a feature, an area (region), a number, a step, an operation, an element, a component, a part, or a combination thereof, and does not preclude the existence or addition of one or more other features, areas (regions), numbers, steps, operations, elements, components, parts, or groups of combinations thereof.

In addition, in describing the embodiments disclosed in the present specification, if it is determined that detailed descriptions of related known technologies may obscure the gist of the embodiments disclosed in this specification, the detailed description thereof will be omitted.

Additionally, unless otherwise defined, all terms used herein, including technical or scientific terms, have the same meaning as commonly understood by a person skilled in the art. Terms such as those defined in the commonly used dictionaries should be construed as having meanings consistent with the meanings in the context of the related art and shall not be construed in ideal or excessively formal meanings unless expressly defined in this application.

As used herein, a "controller" can include one or more of the following components: at least one central processing unit (CPU) configured to execute computer program instructions to perform various processes and methods, random access memory (RAM) and read only memory (ROM) configured to access and store data and information and computer program instructions, input/output (I/O) devices configured to provide input and/or output to the processing controller (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored. In addition, the controller can include antennas, network interfaces that provide wireless and/or wire line digital and/or analog interface to one or more networks over one or more network connections (not shown), a power source that provides an appropriate alternating current (AC) or direct current (DC) to power one or more components of the controller, and a bus that allows communication among the various disclosed components of the controller.

Hereinafter, embodiments of the present disclosure will be described in detail with reference to the accompanying drawings.

Figure 2:
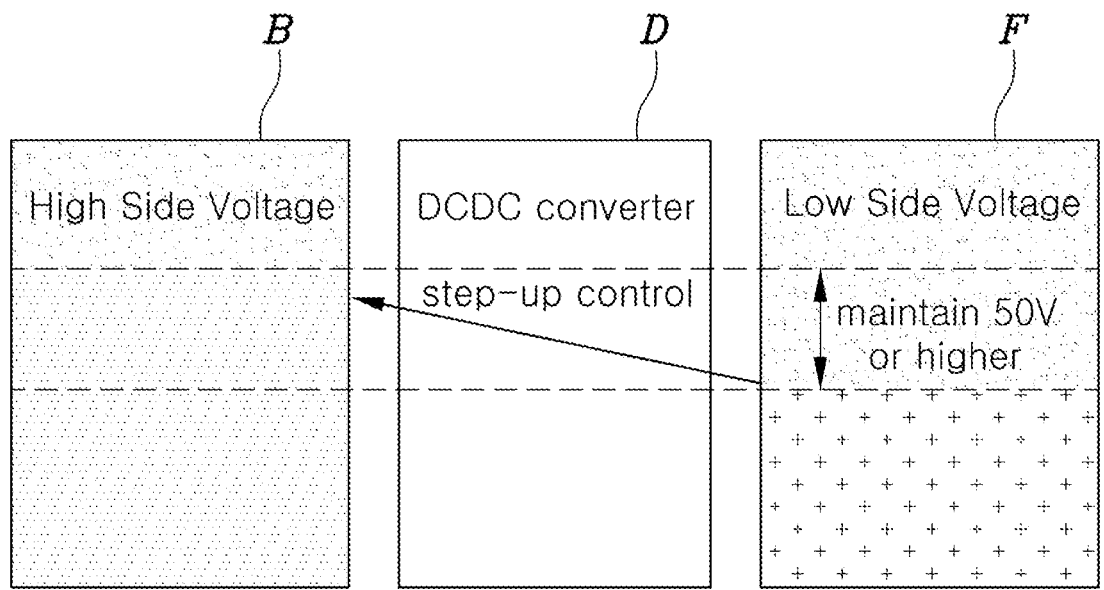
FIG. 2 is a view showing operation states of a DC-to-DC converter when a fuel cell is in a normal state and when reverse voltage occurs in a conventional device for protecting a converter.
Figure 2:
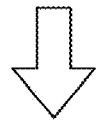
Figure 2:
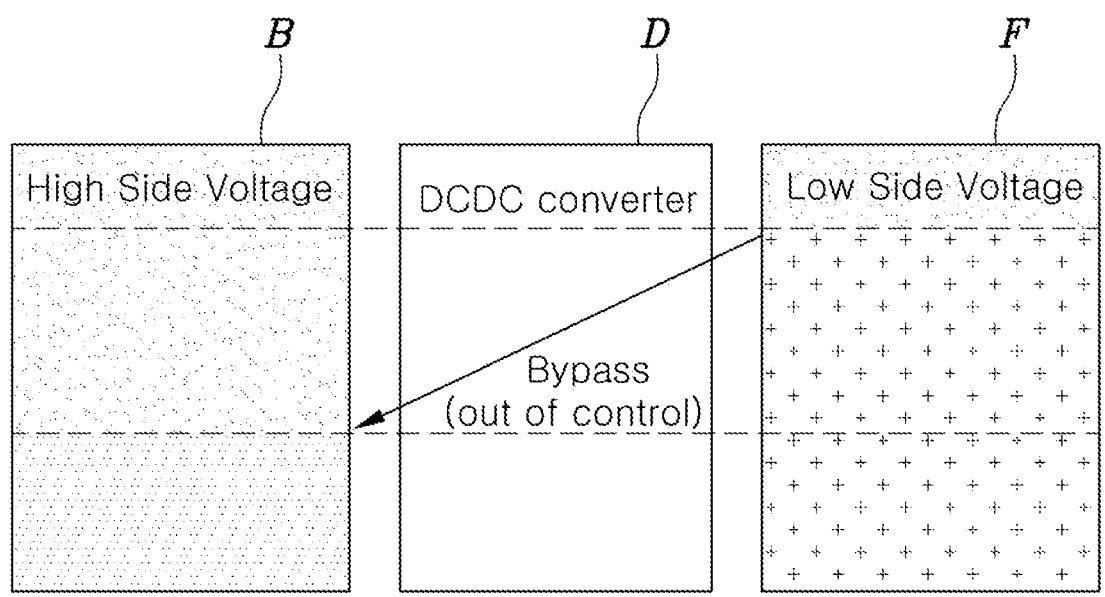
Figure 3:
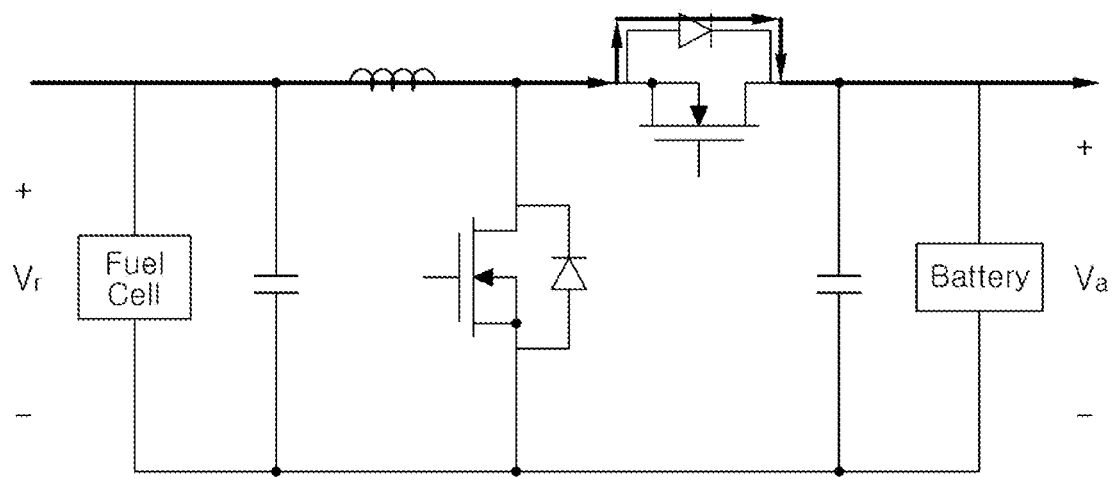
FIG. 3 is a view showing voltages of the DC-to-DC converter when reverse voltage occurs on a fuel cell in the conventional device for protecting a converter.
Figure 4:
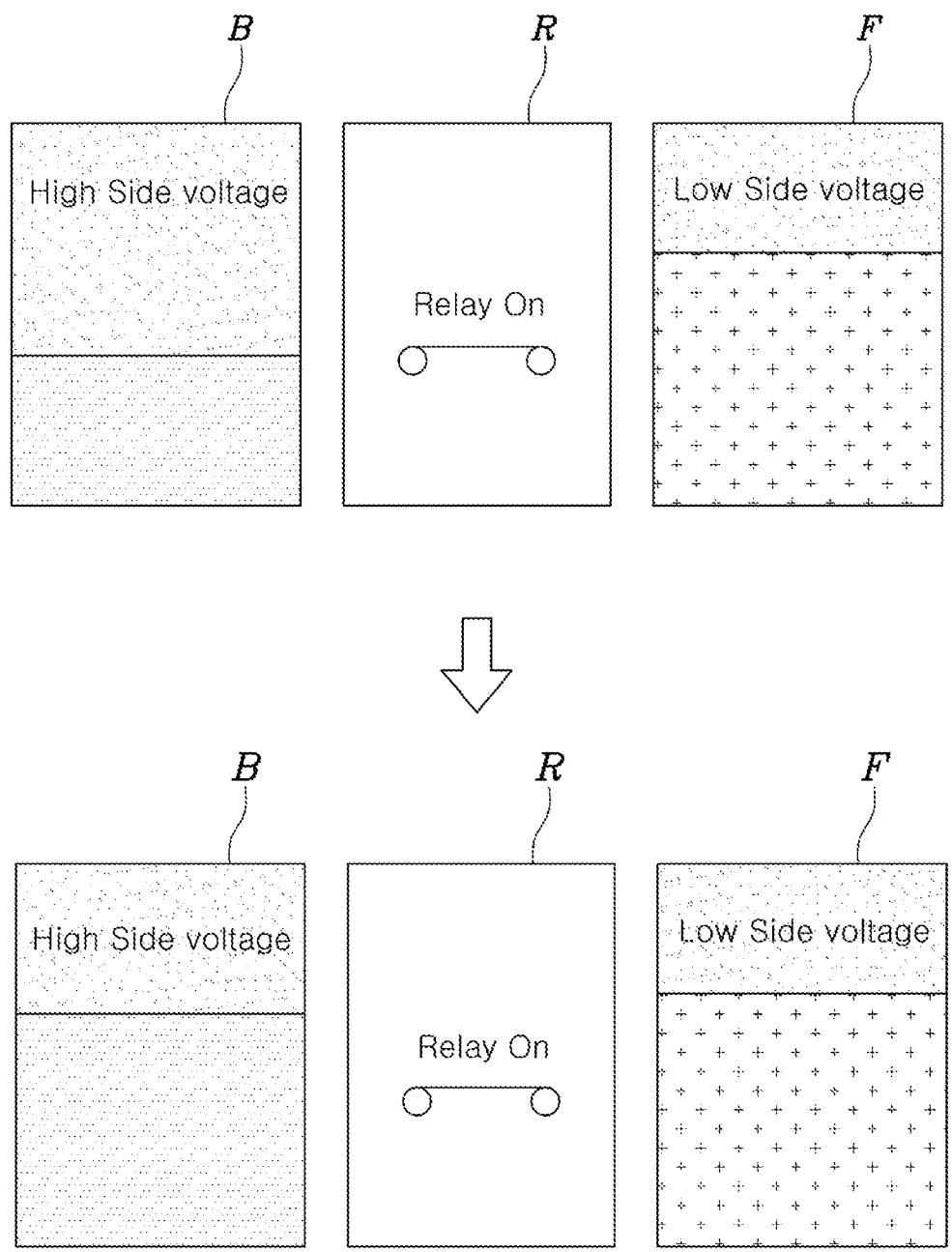
FIG. 4 is a view showing voltages of a DC-to-DC converter before and after a control of a converter protecting device according to an embodiment of the present disclosure.
Figure 5:
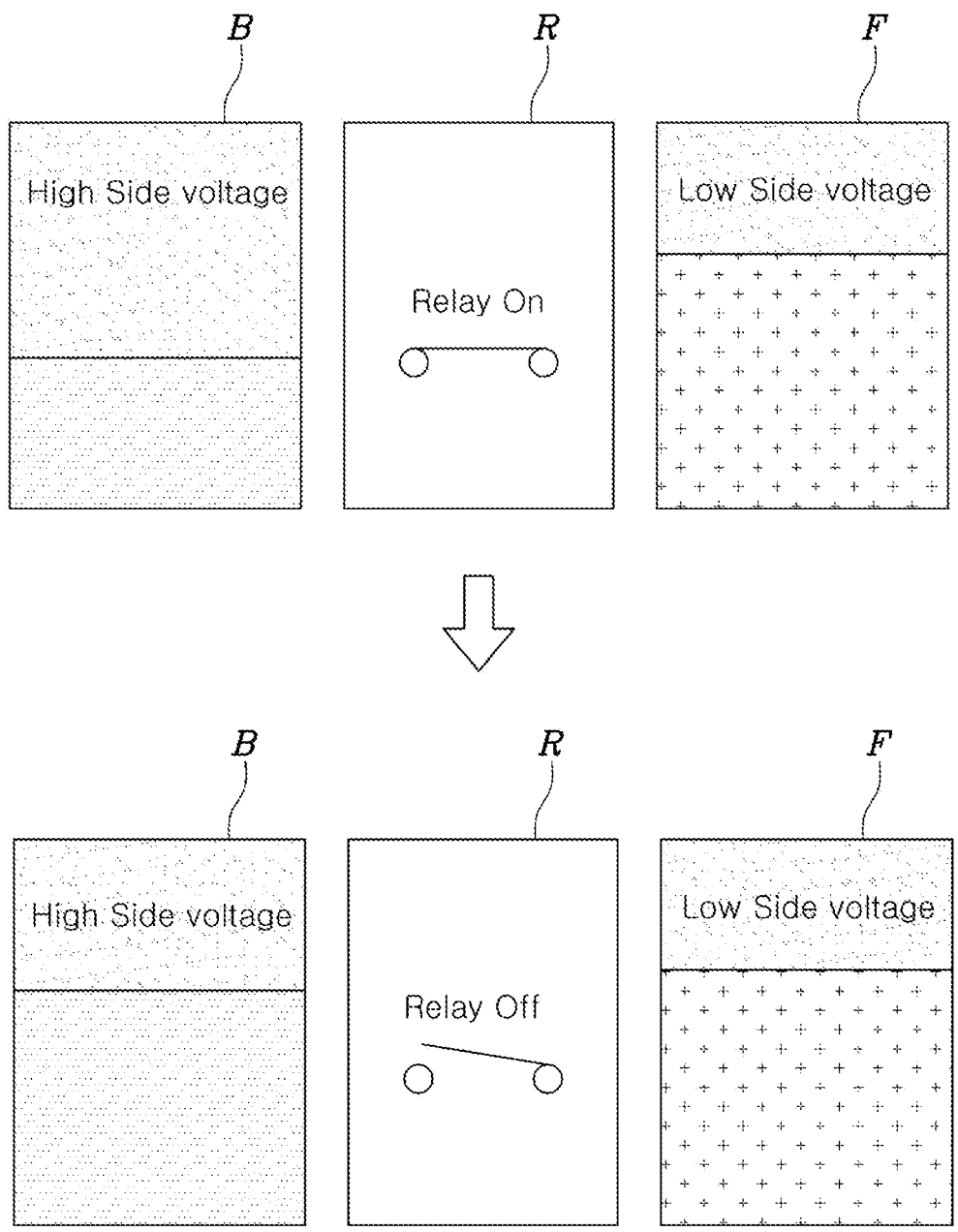
FIG. 5 is a view showing voltages of a DC-to-DC converter before and after another control of a converter protecting device according to an embodiment of the present disclosure.
Figure 6:
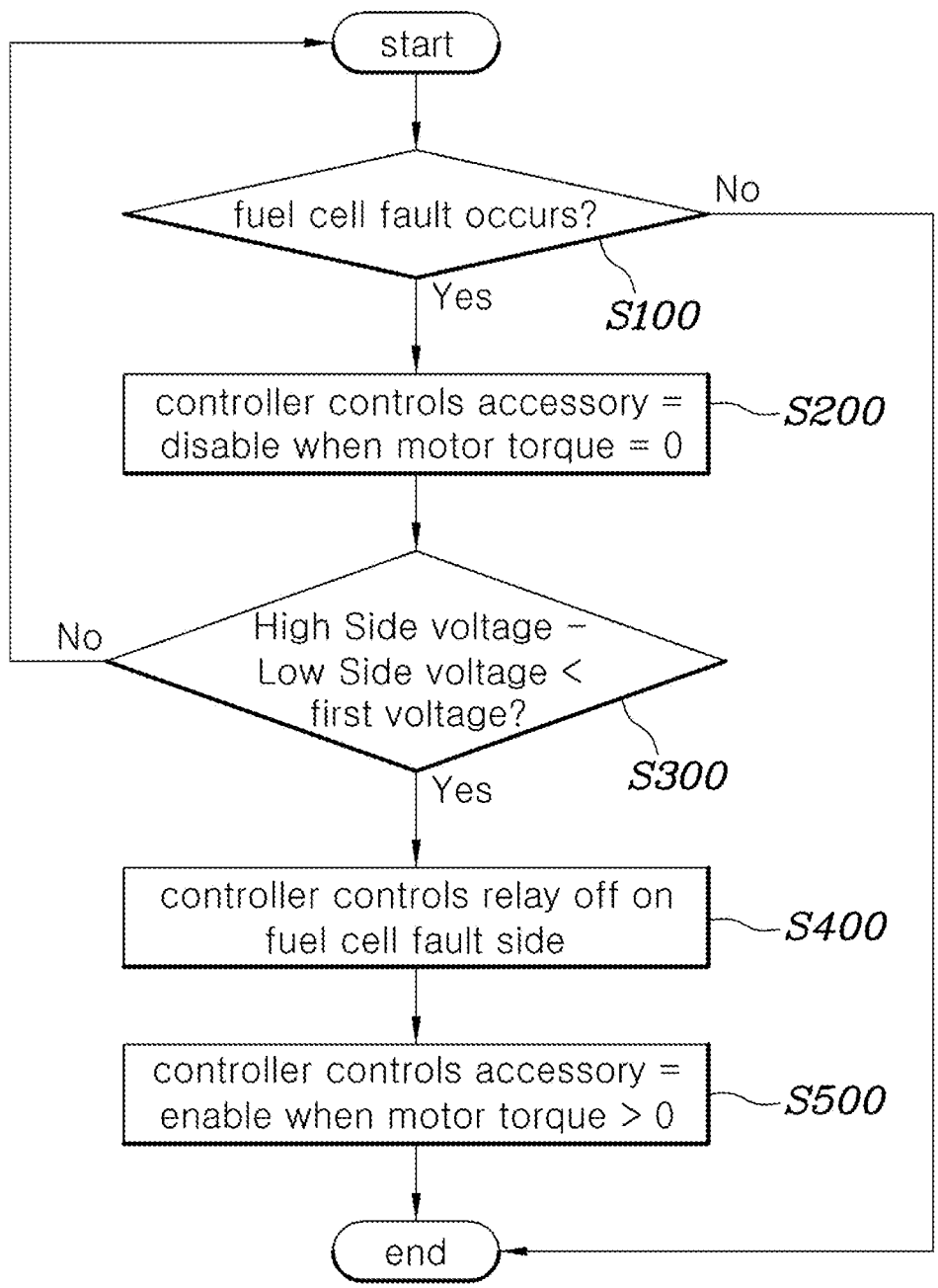
FIG. 6 is a flowchart illustrating a control method of a converter protecting device according to an embodiment of the present disclosure.

FIG. 1 is a block diagram of a device for protecting a converter according to an embodiment of the present disclosure; FIG. 2 is a view showing operation states of a DC-to-DC converter when a fuel cell is in a normal state and when reverse voltage occurs in a conventional device for protecting a converter; FIG. 3 is a view showing voltages of the DC-to-DC converter when reverse voltage occurs on a fuel cell in the conventional device for protecting a converter; FIG. 4 is a view showing voltages of a DC-to-DC converter before and after a control of a converter protecting device according to an embodiment of the present disclosure; FIG. 5 is a view showing voltages of a DC-to-DC converter before and after another control of a converter protecting device according to an embodiment of the present disclosure; and FIG. 6 is a flowchart illustrating a control method of a converter protecting device according to an embodiment of the present disclosure.

FIG. 1 is a block diagram of a device for protecting a converter according to an embodiment of the present disclosure. The device for protecting a converter according to the embodiment of the present disclosure includes: a voltage detection unit (not shown) that detects at least one of an input-stage voltage and an output-stage voltage of the converter D; a switching device (not shown) that connects an output stage of the converter and a load (A, M) connected to the output stage, or blocks a connection; and a controller C that determines whether the detected input-stage voltage or output-stage voltage is out of a preset voltage range, and, when the voltage is out of the range, controls the switching device to cut off the connection between the output stage of the converter and the load.

As shown in FIG. 1, the device for protecting a converter according to the embodiment of the present disclosure includes the controller C that controls the switching device to connect a DC-to-DC converter and a load such as an accessory A and a motor M of a vehicle or to block the connection. In particular, a fuel cell F may be connected to an input stage of the DC-to-DC converter, and a battery B may be connected to an output stage. Here, the voltage detection unit detects the input-stage and output-stage voltages, and inputs the detected voltages to the controller C. When the detected input-stage voltage or output-stage voltage is out of a preset voltage range, the switching device that is responsible for the connection of each load is turned off to cut off the connection between the output stage of the converter D and the accessory A or the motor M, thereby creating a kind of shutdown state in which power may not be supplied to the load from the battery connected to the output stage. Through this, a reverse current condition caused by a reverse voltage created on the fuel cell side is eliminated, which will be described in detail in the following drawings.

In addition, as shown in FIG. 1, the device for protecting a converter may further include a relay R that connects or cuts off a power supplied to accessories A from the fuel cell F. The controller C may control an on/off of the relay on a failed fuel cell side on the basis of the detected input-stage voltage and output-stage voltage after controlling the switching device to cut off the connection between the output stage of the converter D and the load. Accordingly, the reverse flow of current from the fuel cell connected to the input stage to the converter is eliminated, which will be described in detail in the following drawings.

Furthermore, as shown in FIG. 1, the device for protecting a converter according to the embodiment of the present disclosure may include: a driving unit CO that controls an operation of at least one of the fuel cell F and the battery B so that a driving force of the vehicle is not generated by the fuel cell F and the battery B when the connection between the output stage of the converter D and the load is cut off. That is, the vehicle is shut down when the fuel cell becomes uncontrollable due to the reverse voltage. This is a kind of functional safety and prevents converter burnout due to fuel cell failure that may occur while driving the vehicle. If driving in EV mode is immediately possible in case of a fuel cell failure, the driving unit controls only the operation of the fuel cell to stop. However, in a state in which the reverse voltage of the fuel cell is not eliminated, the driving unit controls the operation modes of the fuel cell and the battery to stop. The driver of the vehicle recognizes such a shutdown in advance through a warning device, etc. while driving, and stops the vehicle by relying on the steering system and the brake system.

FIG. 2 is a view showing operation states of a DC-to-DC converter when a fuel cell is in a normal state and when reverse voltage occurs in a conventional device for protecting a converter. Here, the converter includes a boost converter or a buck-boost converter. That is, it is assumed that the voltage of the fuel cell as the voltage applied to the input stage of the converter is boosted to the voltage output to the output stage of the converter. This design is suitable for commercial vehicles in which the battery-side voltage is designed to be higher than the fuel cell-side voltage during normal operation as opposed to passenger cars.

Here, the voltage applied to the input stage of the converter, which is the low side voltage, is step-up controlled by the DC-to-DC converter, and the voltage applied to the output stage of the converter, which is the high side voltage, rises. The step-up amount needs to be maintained a certain voltage (e.g., 50 V) or higher to allow a controlled current to flow to the converter.

However, as shown in the bottom drawing of FIG. 2, when any cell of the fuel cell stack fails or a certain amount of hydrogen is not supplied, the vehicle powered by the fuel cell may not produce the required output even with the same current. Accordingly, the low side voltage rises rapidly, and the high side voltage decreases rapidly since the supply of energy from the low side voltage to the high side voltage is insufficient. Thus, the current that should be step-up controlled by the boost converter is not controlled and flows by bypassing from the low side voltage to the high side voltage. In particular, this may burn out the diode included in the converter to prevent backflow.

FIG. 3 is a view showing voltages of the DC-to-DC converter when reverse voltage occurs on a fuel cell in the conventional device for protecting a converter. The converter shown in FIG. 3 is a boost converter, which boosts the voltage of the fuel cell connected to the input stage and supplies the boosted voltage to the battery in the output stage. When the boost converter is turned on, an inductive load is charged through a closed circuit of the inductive load, and when the boost converter is turned off, the current charged in the inductive load is discharged and boosted, and the current rectified toward the diode is supplied to the battery. However, as the low side voltage on the input side rises due to a failure of the fuel cell, etc., even when the boost converter is on, the uncontrolled current bypasses and rapidly flows toward the diode. Accordingly, the diode is damaged. Although the boost converter is exemplified, the converter in the device for protecting a converter according to an embodiment of the present disclosure is a converter that boosts voltage, and is not limited thereto.

In order to prevent this phenomenon in advance, the device for protecting a converter according to an embodiment of the present disclosure that performs a certain control further includes a temperature sensor (not shown) that senses a temperature of a diode included in the converter, and the controller may determine whether the temperature of the diode detected by the temperature sensor is equal to or greater than a first reference temperature, and, when the temperature of the diode exceeds the first reference temperature and the voltage is out of the range, control the switching device to cut off the connection between the output stage of a boost converter and the load. In another embodiment, the controller may determine whether the temperature of the diode detected by the temperature sensor is equal to or greater than a first reference temperature or whether a temperature change of the diode according to a preset time is equal to or greater than a first reference amount, and, when the temperature of the diode exceeds the first reference temperature and the voltage is out of the range or when the temperature change of the diode exceeds the first reference amount and the voltage is out of the range, control the switching device to cut off the connection between the output stage of the boost converter and the load. In this way, the reverse voltage problem may be solved in advance before the diode is damaged.

A device for protecting a converter according to yet another embodiment of the present disclosure includes: a pressure sensor (not shown) that detects a pressure of hydrogen supplied to the fuel cell; and a hydrogen purge valve that discharges low-pressure hydrogen, condensed water from a hydrogen electrode, and impurities in the fuel cell to an air electrode, and the controller may control the hydrogen purge valve to perform hydrogen purging on the basis of the detected hydrogen pressure after controlling the switching device to cut off the connection between the output stage of the boost converter and the load. In other words, the reverse voltage problem may be solved by breaking the connection between the loads and at the same time resolving the issue of current limit state caused by low-pressure hydrogen.

The device for protecting a converter according to yet another embodiment of the present disclosure further includes: a water level sensor (not shown) that detects a water level in a water trap where water vapor generated in the fuel cell is condensed; and a drain valve that regulates an air pressure in the fuel cell and discharges condensed water in the water trap to an air electrode, and the controller may control the drain valve to discharge water therefrom on the basis of the detected water level in the water trap after controlling the switching device to cut off the connection between the output stage of the boost converter and the load. That is, the reverse voltage problem may be solved by breaking the connection between the loads and at the same time resolving the current limit state that may be caused by the accumulation of condensed water.

FIG. 4 is a view showing voltages of a DC-to-DC converter before and after a control of a device for protecting a converter according to an embodiment of the present disclosure. The controller determines whether the detected input-stage voltage or output-stage voltage is out of a preset voltage range, and, when the voltage is out of the range, controls the switching device to cut off the connection between the output stage of the converter and the load. Here, the relay R in a junction box that connects or cuts off the power supplied from the fuel cell to the accessories is not controlled. As shown in FIG. 4, the controller detects the reverse voltage by determining whether the input-stage voltage of the fuel cell F has risen outside the voltage range or the output-stage voltage has decreased outside the voltage range. Thereafter, the controller C cuts off the connection between the output stage (high side voltage) of the converter on the battery B side and the load, so that the voltage decrease issue at the output stage may be resolved.

FIG. 5 is a view showing voltages of a DC-to-DC converter before and after another control of a converter protecting device according to an embodiment of the present disclosure. The controller C may control the voltage detection unit to detect the input-stage voltage and output-stage voltage of the boost converter and control an on/off of the relay on a failed fuel cell side on the basis of the detected input-stage voltage and output-stage voltage after controlling the switching device to cut off the connection between the output stage of the converter and the load. In addition, the controller C of the converter protecting device according to another embodiment of the present disclosure may control the relay on a failed fuel cell side to be turned off when a result value of subtracting the detected output-stage voltage from the detected input-stage voltage is less than a first voltage. That is, when the result value is decreased by performing the switching device off control, the continuous flow of current due to the reverse voltage of the fuel cell is prevented by turning off the relay.

In yet another embodiment, the controller C in the converter protecting device according to an embodiment of the present disclosure may control the operation of at least one of the fuel cell F and the battery B to generate driving force of the vehicle only with the battery B after controlling the relay R to be turned off. In other words, the device for protecting a converter according to an embodiment of the present disclosure makes it possible to move a vehicle to a safe area by allowing to generate driving force only with the battery as an emergency driving in order to solve the fuel cell failure in the shutdown state where the load is cut off after the reverse voltage problem is solved.

In the device for protecting a converter according to another embodiment of the present disclosure, the controller C may monitor the voltage of each cell constituting the fuel cell stack, diagnose the fuel cell failure in advance on the basis of the average cell voltage or the minimum cell voltage being reduced below a certain level, and perform the above control according to the diagnosis result and when the average cell voltage or the minimum cell voltage is outside the preset range.

FIG. 6 is a flowchart illustrating a control method of a device for protecting a converter according to an embodiment of the present disclosure. The control method of a converter protecting device according to the embodiment of the present disclosure, which is a control method of a device for protecting a boost converter included in a vehicle powered by a fuel cell and a battery, the method includes: detecting, by a voltage detection unit, at least one of an input-stage voltage and an output-stage voltage of the boost converter; controlling S200, by a controller, a switching device, to cut off a connection between the output stage of the boost converter and a load when the detected input-stage voltage or output-stage voltage is out of a preset voltage range after determining S100 whether the voltage is out of the range; and controlling S200, by the controller, an operation of at least one of the fuel cell and the battery so that a driving force of the vehicle is not generated by the fuel cell and the battery when the connection is cut off. The method is to prevent the diode from burning by controlling so that the driving force is not generated by the battery and/or the fuel cell until the reverse voltage problem is solved.

The control method of a device for protecting a converter according to the embodiment of the present disclosure may further include: controlling (S300) the voltage detection unit to detect the input-stage voltage and the output-stage voltage of the boost converter after controlling the switching device, and controlling (S400) an on/off of a relay that connects or cuts off a power supplied to accessories from the fuel cell on a failed fuel cell side on the basis of the detected input-stage voltage and output-stage voltage. In a control method of a device for protecting a converter according to another embodiment of the present disclosure, in the controlling (S400) an on/off of a relay, the relay on the failed fuel cell side may be controlled to be turned off when a result value of subtracting the detected output-stage voltage from the detected input-stage voltage is less than a first voltage. The method may further include: controlling (S500) the operation of at least one of the fuel cell F and the battery B to drive the motor and generate driving force of the vehicle only with the battery B after the controller controls the relay to be turned off. This step may include activating accessories. In other words, the device for protecting a converter according to an embodiment of the present disclosure makes it possible to move a vehicle to a safe area by allowing to generate driving force only with the battery as an emergency driving in order to solve the fuel cell failure in the shutdown state where the load is cut off after the reverse voltage problem is resolved.

As mentioned above, a device for protecting a converter and a control method thereof according to the present disclosure protect the converter that boosts the low voltage of a fuel cell from damage due to overcurrent caused by reverse voltage created by a failure of a fuel cell, etc. in a system that generates driving force using the fuel cell and a battery.

In addition, the device for protecting a converter according to the present disclosure may prevent damage to a converter and other electric powered parts, thereby reducing costs due to replacement of parts and preventing performance degradation of a fuel cell vehicle.

Furthermore, the device for protecting a converter according to the present disclosure may increase the operable time of a fuel cell vehicle by preventing a decrease in durability of a fuel cell stack.

A control unit (processor) implementing the above-described functions, processes and/or methods may process data in a state in which power is supplied, generate a control signal, and provide the control signal. In addition, the control unit may be included in a server. The control unit may be configured as a processing circuitry for controlling functions of the server, and the server may include a control unit, a transmitter, a receiver, and a memory.

The control unit may be implemented using at least one of application specific integrated circuits (ASICs), digital signal processors (DSPs), programmable logic devices (PLDs), field programmable gate arrays (FPGAs), controllers, microcontrollers, micro control units, and other electrical units for performing functions.

In addition, the control unit may store program codes and data, and be electrically connected to a memory as a computer-readable recording medium to exchange signals.

The memory may store data processed by the control unit. The memory may be configured as at least one of ROM, RAM, EPROM, a flash drive, and a hard drive in terms of hardware. The memory may be implemented integrally with the program or may be classified as a sub-component of the control unit.

So far, the embodiments were looked at with respect to the present disclosure. Those of ordinary skill in the art to which the present disclosure pertains, however, will understand that the present disclosure may be implemented in a modified form without departing from the essential characteristics of the present disclosure.

In other words, since various changes may be made to the embodiments according to the present disclosure and the embodiments may have various forms, specific embodiments may be illustrated in the drawings and described in detail in the present specification or application. However, this is not intended to limit the embodiment according to the concept of the present disclosure to a specific disclosed form, but it should be understood to include all changes, equivalents and substitutes included in the spirit and scope of the present disclosure.

Therefore, the disclosed embodiments may be to be considered in an illustrative rather than a restrictive sense. The scope of the present disclosure is indicated in the claims rather than the foregoing description, and all differences within the scope equivalent thereto should be construed as being included in the present disclosure.

What is claimed is:

1. A device for protecting a boost converter included in a vehicle powered by a fuel cell and a battery, the device comprising:
   a voltage detection unit configured to detect at least one of: an input-stage voltage and an output-stage voltage of the boost converter;
   a switching device configured to connect an output stage of the boost converter and a load connected to the output stage, or cut off an electrical connection between the output stage of the boost converter and the load;
   a controller configured to determine whether a detected input-stage voltage and the output-stage voltage are outside of a preset voltage range,
   wherein when the controller determines the detected input-stage voltage and the output-stage voltage are outside of the preset voltage range, the controller directs the switching device to cut off the electrical connection between the output stage of the boost converter and the load;
   a driving unit configured to control an operation of at least one of: the fuel cell and the battery such that a driving force of the vehicle is not generated by the fuel cell and the battery when the electrical connection is cut off; and
   a relay configured to connect or cut off power supplied to accessories from the fuel cell,
   wherein the controller is configured to direct the voltage detection unit to detect the input-stage voltage and the output-stage voltage of the boost converter after directing the switching device to cut off the electrical connection between the output stage of the boost converter and the load when the detected input-stage voltage and output-stage voltage are outside of the preset range,
   wherein the controller is configured to direct an on/off function of the relay on a failed fuel cell side on the basis of the detected input-stage voltage and output-stage voltage, and
   wherein the controller is configured to direct the relay on the failed fuel cell side to be turned off when a result value of subtracting the detected output-stage voltage from the detected input-stage voltage is less than a first voltage.

2. The device of claim 1, wherein the controller is configured to direct the operation of at least one of the fuel cell and the battery to generate the driving force of the vehicle only after directing the relay to be turned off.

3. The device of claim 1, further comprising:
   a pressure sensor configured to detect a pressure of hydrogen supplied to the fuel cell; and
   a hydrogen purge valve configured to discharge low-pressure hydrogen, condensed water from a hydrogen electrode, and impurities in the fuel cell to an air electrode,
   wherein the controller is further configured to direct the hydrogen purge valve to perform hydrogen purging on the basis of the detected hydrogen pressure after directing the switching device to cut off the electrical connection between the output stage of the boost converter and the load.

4. The device of claim 1, further comprising:
   a water level sensor configured to detect a water level in a water trap where water vapor generated in the fuel cell is condensed; and
   a drain valve configured to regulate an air pressure in the fuel cell and discharge condensed water in the water trap to an air electrode,
   wherein the controller is further configured to direct the drain valve to discharge water therefrom on the basis of the detected water level in the water trap after directing the switching device to cut off the electrical connection between the output stage of the boost converter and the load.

5. The device of claim 1, further comprising:
   a temperature sensor configured to sense a temperature of a diode included in the converter,
   wherein the controller is configured to determine whether the temperature of the diode detected by the temperature sensor is equal to or greater than a first reference temperature and/or whether a temperature change of the diode according to a preset time interval is equal to or greater than a first reference amount,
   wherein when the controller determines the temperature of the diode is greater than the first reference temperature and the detected input-stage voltage and/or output-stage voltage is outside of the preset voltage range the controller directs the switching device to cut off the electrical connection between the output stage of the converter and the load, and
   wherein when the controller determines the temperature change of the diode is equal to the first reference amount and the detected input-stage voltage and/or output-stage voltage is outside of the preset range the controller directs the switching device to cut off the electrical connection between the output stage of the boost converter and the load.

6. The device of claim 1, further comprising:
   a warning device, and
   wherein the controller is configured to direct the warning device to be turned on after directing the switching device to cut off the electrical connection between the output stage of the boost converter and the load.

7. A control method of a device for protecting a boost converter included in a vehicle powered by a fuel cell and a battery, the method comprising:

detecting, by a voltage detection unit, at least one of: an input-stage voltage and an output-stage voltage of the boost converter;

controlling, by a controller, a switching device, to cut off an electrical connection between an output stage of the boost converter and a load connected to the output stage when the detected input-stage voltage and the output-stage voltage are outside of a preset voltage range after determining whether the voltage is outside of the preset range; and controlling, by the controller, an operation of at least one of the fuel cell and the battery so that a driving force of the vehicle is not generated by the fuel cell and the battery when the connection is cut off, wherein controlling the switching device further comprises: controlling an on/off function of a relay configured to connect or cut off a power supplied to accessories from the fuel cell on a failed fuel cell side on the basis of the detected input-stage voltage and output-stage voltage after controlling the voltage detection unit to detect the input-stage voltage and the output-stage voltage of the boost converter after controlling the switching device, and wherein in controlling the on/off function of the relay, the relay is controlled to be turned off when a result value of subtracting the detected output-stage voltage from the detected input-stage voltage is less than a first voltage.

\* \* \* \* \*